(12) United States Patent
Kim et al.

(10) Patent No.: US 9,127,171 B2
(45) Date of Patent: *Sep. 8, 2015

(54) ANTI-REFLECTION FILM AND METHOD FOR MANUFACTURING THE SAME

(75) Inventors: Heon Kim, Daejeon (KR); Yeong-Rae Chang, Daejeon (KR); Soon-Hwa Jung, Daejeon (KR); Jin-Young Park, Daejeon (KR); Boo-Kyung Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/702,908

(22) PCT Filed: Jul. 8, 2011

(86) PCT No.: PCT/KR2011/005020
§ 371 (c)(1),
(2), (4) Date: Dec. 7, 2012

(87) PCT Pub. No.: WO2012/005542
PCT Pub. Date: Jan. 12, 2012

(65) Prior Publication Data
US 2013/0078440 A1    Mar. 28, 2013

(30) Foreign Application Priority Data

Jul. 8, 2010 (KR) .................. 10-2010-0065981

(51) Int. Cl.
| | |
|---|---|
| C09D 5/00 | (2006.01) |
| G02B 1/11 | (2015.01) |
| G02B 1/111 | (2015.01) |
| C09D 7/00 | (2006.01) |
| C09D 7/12 | (2006.01) |
| G02B 1/115 | (2015.01) |
| C08F 220/22 | (2006.01) |
| B82Y 30/00 | (2011.01) |
| C08F 222/10 | (2006.01) |

(52) U.S. Cl.
CPC ............. C09D 5/006 (2013.01); C08F 220/22 (2013.01); C09D 7/005 (2013.01); C09D 7/1291 (2013.01); G02B 1/11 (2013.01); G02B 1/111 (2013.01); G02B 1/115 (2013.01); B82Y 30/00 (2013.01); C08F 222/1006 (2013.01); Y10T 428/24942 (2015.01)

(58) Field of Classification Search
CPC .................................. C09D 5/006; G02B 1/111
See application file for complete search history.

(56) References Cited

U.S. PATENT DOCUMENTS

| | | | | |
|---|---|---|---|---|
| 7,960,021 | B2 * | 6/2011 | Im et al. ................ | 428/327 |
| 8,110,249 | B2 * | 2/2012 | Kang et al. ............. | 427/162 |
| 2005/0008863 | A1 * | 1/2005 | Mimura et al. ......... | 428/409 |
| 2006/0204528 | A1 * | 9/2006 | Nolte et al. ............. | 424/401 |
| 2006/0269731 | A1 * | 11/2006 | Yoshikawa et al. ..... | 428/212 |
| 2006/0269733 | A1 * | 11/2006 | Mizuno et al. .......... | 428/304.4 |
| 2009/0004462 | A1 * | 1/2009 | Zhang et al. ............ | 428/331 |
| 2010/0003501 | A1 * | 1/2010 | Liu et al. ................ | 428/327 |
| 2010/0021694 | A1 * | 1/2010 | Wakizaka et al. ...... | 428/172 |
| 2010/0027126 | A1 * | 2/2010 | Chen et al. ............. | 359/601 |
| 2010/0076109 | A1 * | 3/2010 | Kang et al. ............. | 522/78 |
| 2010/0178512 | A1 * | 7/2010 | Giesenberg et al. ... | 428/405 |
| 2010/0189970 | A1 * | 7/2010 | Pokorny et al. ........ | 428/212 |
| 2010/0246014 | A1 * | 9/2010 | Asahi et al. ............. | 359/585 |
| 2010/0291364 | A1 * | 11/2010 | Kourtakis et al. ...... | 428/212 |
| 2013/0045387 | A1 * | 2/2013 | Chu et al. ............... | 428/410 |
| 2013/0084442 | A1 * | 4/2013 | Akutagawa et al. .... | 428/212 |
| 2013/0329297 | A1 * | 12/2013 | Hayashi et al. ........ | 359/601 |

FOREIGN PATENT DOCUMENTS

| | | |
|---|---|---|
| CN | 101184815 A | 5/2008 |
| JP | 2006028322 A * | 2/2006 |
| JP | 2009036817 A | 2/2009 |
| JP | 2009-198748 | 9/2009 |
| JP | 2009197155 A | 9/2009 |
| KR | 102006011162 | 10/2006 |
| KR | 10-2008-0063107 | 7/2008 |
| KR | 10-2009-0049558 | 5/2009 |
| KR | 10-2009-0119968 | 11/2009 |
| TW | 200505677 | 2/2005 |

(Continued)

OTHER PUBLICATIONS

NPL publication on colloidal silica.*
NPL publication on colloidal sillica.*

(Continued)

*Primary Examiner* — Aaron Austin
*Assistant Examiner* — Zheren J Yang
(74) *Attorney, Agent, or Firm* — Dentons US LLP

(57) ABSTRACT

Disclosed is an anti-reflection film comprising a high refractive index layer comprising a first binder including a crosslinked polymer of a multifunctional (meth)acrylate compound, and nano silica particles dispersed in the first binder; and a low refractive index layer laminated on the high refractive index layer, and comprising a second binder including a crosslinked copolymer of a multifunctional (meth)acrylate compound and a fluorine-based (meth)acrylate compound, and hollow silica particles and hollow silica particles coated with a fluorine-based compound on the surface, which are dispersed in the second binder, wherein the weight ratio of the hollow silica particles to the hollow silica particles coated with a fluorine-based compound is 1:1~10. Also disclosed is a method for manufacturing the anti-reflection film using a composition that is separated into at least two layers by phase separation after single layer coating by a more simplified process.

8 Claims, No Drawings

(56) References Cited

FOREIGN PATENT DOCUMENTS

| WO | 2006101218 A1 | 9/2006 |
| WO | WO 2009064128 A2 * | 5/2009 |

OTHER PUBLICATIONS

Derwent Abstract of JP 2006/028322 A. Abstract was entered into Derwent databases in week 18 of 2006 and was retrieved from the database on Jun. 24, 2015.*

* cited by examiner

ANTI-REFLECTION FILM AND METHOD FOR MANUFACTURING THE SAME

This application is a National Stage Entry of International Application No. PCT/KR2011/005020, filed Jul. 8, 2011, and claims the benefit of Korean Application No. 10-2010-0065981, filed on Jul. 8, 2010, which are hereby incorporated by reference in their entirety for all purposes as if fully set forth herein.

TECHNICAL FIELD

This disclosure relates to an anti-reflection film and a method for manufacturing the same.

BACKGROUND OF ART

In general, a display device such as PDP, CRT, LCD, and the like is equipped with an anti-reflection film (or an anti-glare film) for minimizing reflection of light entering the screen from outside.

In the existing anti-reflection film, an anti-reflection layer is predominantly disposed on a light-transmitting base, and an anti-reflection layer with a triple-layered structure wherein a hard coat layer, a high refractive index layer with a thickness of 1 μm or more, and a low refractive index layer are sequentially deposited is widely used (for example, Japanese Laid-Open Patent Publication No. 2002-200690).

Recently, to simplify the manufacturing process, the high refractive index layer is skipped in the anti-reflection layer, and a double-layered structure wherein a hard coat layer and a low refractive index layer are deposited are commonly used. (for example, Japanese Laid-Open Patent Publication No. 2000-233467).

Further, to combine both anti-glare property and scratch resistance, an anti-reflection film equipped with an anti-glare had coat layer is used. In this regard, a technology of coexisting anti-glare property and light-transmittance by controlling the thickness of the anti-glare hard coat layer to 50-90% of the average particle diameter of light-transmitting particles for forming a mat has been suggested (for example, Japanese Laid-Open Patent Publication No. 1996-309910).

Meanwhile, an anti-reflection film is generally manufactured by a dry method or a wet method.

According to the dry method, material having low refractive index (for example, $MgF_2$, $SiO_2$, and the like) is deposited on a base film as a thin film by deposition or sputtering, or material having high refractive index (for example, ITO (tin doped indium oxide), ATO (tin doped antimony oxide), ZnO, $TiO_2$, and the like) and material having low refractive index are alternatively deposited. Although the dry method may manufacture an anti-reflection film having strong interfacial adhesion, it is not commercially widely used due to the high manufacture cost.

Meanwhile, according to the wet method, a coating composition comprising polymer resin, an organic solvent, and the like is coated on a base film, dried and cured. And, the wet method is widely commercially used due to relatively low manufacture cost compared to the dry method.

However, since the wet method should separately conduct processes of forming each layer of a hard coat layer, a high refractive index layer and a low refractive index layer, and the like included in the anti-reflection film, the manufacturing process is complicated, and interfacial adhesion is weak.

Thus, studies are actively progressed on an anti-reflective coating composition capable of forming 2 or more layers by single wet coating.

However, since phase separation is not smoothly achieved by coating of a composition, many problems including deteriorated function as each layer still exist.

DISCLOSURE OF INVENTION

Technical Problem

Accordingly, the present invention provides an anti-reflection film manufactured using an anti-reflective coating composition that may be smoothly phase-separated into at least two layers only by single coating process.

The present invention also provides a method for manufacturing an anti-reflection film by a more simplified process using the above composition.

Technical Solution

According to the present invention, provided is an anti-reflection film comprising a high refractive index layer comprising a first binder including a crosslinked polymer of a multifunctional (meth)acrylate compound, and nano silica particles dispersed in the first binder; and a low refractive index layer laminated on the high refractive index layer, and comprising a second binder including a crosslinked copolymer of a multifunctional (meth)acrylate compound and a fluorine-based (meth)acrylate compound, and hollow silica particles and hollow silica particles coated with a fluorine-based compound on the surface, which are dispersed in the second binder.

The hollow silica particles coated with a fluorine-based compound on the surface in the low refractive index layer may have a distribution gradient increasing toward a direction away from the high refractive index layer.

And, the high refractive index layer may have a refractive index of 1.5 to 1.58, and the low refractive index may have a refractive index of 1.1 to 1.45.

And, the fluorine-based compound coated on the hollow silica particles may have a refractive index of 1.3~1.4 and surface tension of 10~25 mN/m.

Preferably, the fluorine-based compound coated on the hollow silica particles may be a fluorine-containing alkoxysilane compound.

More preferably, the fluorine-based compound coated on the hollow silica particles may be at least one selected from the group consisting of tridecafluorooctyl triethoxy silane, heptadecafluorodecyl trimethoxy silane, and heptadecaflouorodecyl triisopropoxy silane.

And, the fluorine-based (meth)acrylate compound may be at least one selected from the group consisting of the following Chemical Formula 1 to 5:

[Chemical Formula 1]

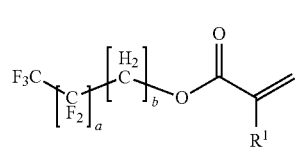

in the Chemical Formula 1, $R^1$ is a hydrogen or C1-C6 alkyl group, a is an integer of from 0 to 7, and b is an integer of from 1 to 3;

[Chemical Formula 2]

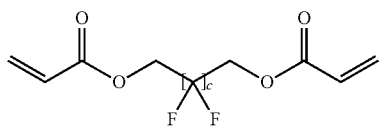

in the Chemical Formula 2, c is an integer of form 1 to 10;

[Chemical Formula 3]

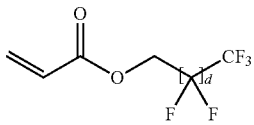

in the Chemical Formula 3, d is an integer of from 1 to 11;

[Chemical Formula 4]

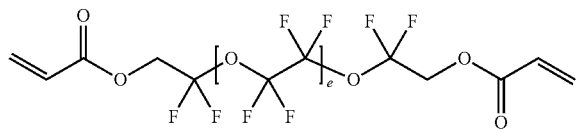

in the Chemical Formula 4, e is an integer of from 1 to 5;

[Chemical Formula 5]

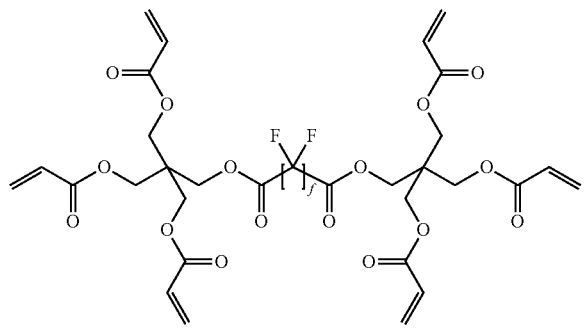

in the Chemical Formula 5, f is an integer of from 4 to 10.

And, the nano silica particles in the high refractive index layer may have number average particle diameter of 100 nm or less.

And, the hollow silica particles and the hollow silica particles coated with the fluorine-based compound in the low refractive index layer may respectively have a number average particle diameter of 1 to 200 nm.

And, the weight ratio of the hollow silica particles coated with the fluorine-based compound to the hollow silica particles in the low refractive index layer may be 1:0.1~20.

According to the present invention, also provided is a method for manufacturing an anti-reflection film comprising preparing a composition comprising a multifunctional (meth)acrylate compound, a fluorine-based (meth)acrylate compound, nano silica particles, hollow silica particles, hollow silica particles coated with a fluorine-based compound, a solvent, and an initiator;

coating the composition on at least one side of a base film;

drying the coated composition; and curing the dried composition.

The composition may comprise, based on 100 parts by weight of the multifunctional (meth)acrylate compound; 1 to 30 parts by weight of the fluorine-based (meth)acrylate compound; 1 to 30 parts by weight of the nano silica particles; 1 to 20 parts by weight of the hollow silica particles; 1 to 60 parts by weight of the hollow silica particles coated with a fluorine-based compound; 100 to 500 parts by weight of the solvent; and 1 to 20 parts by weight of the initiator.

The drying may be conducted at a temperature of form 5 to 150° C. for 0.1 to 60 minutes.

The curing may be conducted after the composition coated on the base film is phase-separated into at least one layer according to the distribution gradient of the hollow silica particles coated with a fluorine-based compound.

The curing may be conducted by heat curing by heat treatment at a temperature of from 20 to 150° C. for 1 to 100 minutes, or by UV curing by UV irradiation at a UV irradiation amount of 0.1 to 2 J/cm$^2$ for 1 to 600 seconds.

Advantageous Effects

The method for manufacturing an anti-reflection film according to the present invention may manufacture an anti-reflection film by a more simplified process by using a composition capable of simultaneously forming at least two layers only by single coating. Since an interface of each layer of the anti-reflection film manufactured by the method of the present invention is substantially chemically bonded or crosslinked, delamination of each layer may be minimized, and it has excellent scratch resistance and anti-reflection effects.

BEST MODE FOR CARRYING OUT THE INVENTION

Hereinafter, an anti-reflection film, and a method for manufacturing the same according to the embodiments of the invention will be explained.

The terms used herein are defined as follows, unless otherwise described.

The term 'nano silica particles' refers to particles derived from a silicon compound or an organic silicon compound, which have a number average particle diameter of nanometer scale, preferably 100 nm or less, and it means amorphous particles which do not substantially have a hollow space in the particles.

The term 'hollow silica particles' refers to silica particles derived from a silicon compound or an organic silicon compound, which have a hollow space on the surface and/or inside thereof. The description 'hollow silica particles coated with a fluorine-based compound on the surface' means that the surface of the hollow silica particle is treated with a fluorine-based compound, and the description 'hollow silica particles' means that the surface is not coated.

And, the 'surface energy' refers to a potential energy for minimizing free surface area, and 'surface tension' is defined as a surface energy per a unit surface area. Thus, the surface tension and the surface energy indicate the degree of minimizing the surface, which are indicators of the same or equivalent physical properties.

And, the term '(meth)acrylate' commonly designates acrylate or methacrylate.

And, the term 'coating layer' refers to a coating layer formed by coating the anti-reflective coating composition of the present invention on a base film.

And, the term 'phase separation' means that a gradient is formed for the distribution of a specific ingredient included in the composition according to difference in the density, surface tension or other physical properties of the ingredient. If the coating layer is phase separated, it may be divided into at least two layers according to the distribution of a specific ingredient, for example, the distribution of one of the hollow silica particles or the hollow silica particles coated with fluorine-based compound on the surface.

And, the term 'a fluorine-based alkoxysilane compound' or 'a fluorine-containing alkoxysilane compound' refers to a compound wherein a fluorine atom is bonded or substituted in alkoxysilane. To the contrary, 'an alkoxysilane compound' refers to an alkoxysilane compound excluding the fluorine-based alkoxysilane compound (specifically, an alkoxysilane compound wherein a fluorine atom is not bonded or substituted).

And, the term 'fluorine-based (meth)acrylate' refers to a compound wherein a fluorine atom is bonded or substituted in (meth)acrylate. To the contrary, '(meth)acrylate' refers to (meth)acrylate excluding the fluorine-based (meth)acrylate (specifically, (meth)acrylate wherein a fluorine atom is not bonded or substituted).

And, the 'high refractive index layer' refers to a layer that has relatively high refractive index with reference to the low refractive index layer, and is positioned lower than the low refractive index layer based on the distance from the base film (lower part of the coating layer), wherein one of the hollow silica particles or the hollow silica particles coated with a fluorine-based compound on the surface are not substantially distributed. The description that the hollow silica particles, and the like are not substantially distributed means that they are included in an amount less than 1 wt %, based on the total weight of the hollow particles or the hollow silica particles coated with a fluorine-based compound on the surface.

And, the 'low refractive index layer' refers to a layer that has relatively low refractive index with reference to the above mentioned high refractive index layer, and is positioned upper than the high refractive index layer based on the distance from the base film (upper part of the coating layer), wherein the hollow silica particles or hollow silica particles coated with a fluorine-based compound are distributed.

Meanwhile, the inventors, during repeated studies on an anti-reflection film, confirmed that if a composition comprising nano silica particles, hollow silica particles, and hollow silica particles coated with a fluorine-based compound as inorganic particles, and simultaneously comprising a multifunctional (meth)acrylate compound and a fluorine-based (meth)acrylate compound as a binder is used, phase separation smoothly occurs only by single coating, thus manufacturing an anti-reflection film by a simplified method, and completed the present invention.

Specifically, in the prior art, to form an anti-reflection film, compositions for forming a hard coat layer, a high refractive index layer, and a low refractive index layer, and the like are respectively prepared, and a process of coating on a base film and curing is repeated. However, this method has low productivity due to complicated manufacturing process, and each layer may be easily delaminated during use due to weak interfacial adhesion.

Further, in the prior art, a method of controlling a refractive index by dispersing metal oxide particles such as zirconium oxide, antimony containing tin oxide, and the like in a high refractive index layer, and dispersing hollow silica particles in a low refractive index layer is used, however, this method has a limitation in obtaining sufficient anti-reflection effect because it has a problem such as haze value increase due to metal oxide particles, and the like. And, if the metal oxide particles are dispersed in a high refractive index layer, another acrylate based resin layer (for example, a layer commonly referred to as a hard coating layer) should be further included to improve scratch resistance. Thus, this method has a problem such as inconvenience in the manufacturing process, and is distinguished from the anti-reflection film according to one embodiment of the invention that may be formed only by single coating without need to separately form a hard coating layer, and the like.

Since the anti-reflection film of the present invention is manufactured using a composition comprising nano silica particles, hollow silica particles and hollow silica particles coated with a fluorine-based compound as inorganic particles, and simultaneously comprising a multifunctional (meth)acrylte and a fluorine-based (meth)acrylate compound as a binder, phase separation may smoothly occur only by single coating in the composition coating layer, and thus the anti-reflection film may be manufactured by a simplified process.

And, since the anti-reflection film of the present invention is manufactured using the above composition, nano silica particles having relatively high density may be dispersed in the high refractive index layer; and simultaneously, hollow silica particles and hollow silica particles coated with a fluorine-based compound, having relatively low density, may be dispersed in the low refractive index layer, and particularly, the hollow silica particles coated with a fluorine-based compound may be dispersed so that the distribution gradient may increase toward a direction away from the high refractive index layer. Thereby, each interface of the layers in the anti-reflection film of the present invention is substantially chemically bonded or cross-linked, and thus, delamination may be minimized, and refractive index of each layer may be controlled to a lower range, thus exhibiting more improved anti-reflection effect and scratch resistance.

According to one embodiment of the invention, provided is an anti-reflection film comprising a high refractive index layer comprising a first binder including a crosslinked polymer of a multifunctional (meth)acrylate compound, and nano silica particles dispersed in the first binder; and a low refractive index layer laminated on the high refractive index layer, and comprising a second binder including a crosslinked copolymer of a multifunctional (meth)acrylate compound and a fluorine-based (meth)acrylate compound, and hollow silica particles and hollow silica particles coated with a fluorine-based compound on the surface, which are dispersed in the second binder.

The high refractive index layer refers to a layer having relatively high refractive index with reference to the low refractive index layer, wherein the hollow silica particles and the hollow silica particles coated with a fluorine-based compound are not substantially distributed. The description that 'the hollow silica particles, and the like are not substantially distributed' means that the total amount of the hollow silica particles and the hollow silica particles coated with a fluorine-based compound included in the composition is less than 1 wt %.

The high refractive index layer may have a refractive index of 1.5 to 1.58 by comprising the first binder and the nano silica particles dispersed in the first binder.

The nano silica particles are particles derived from a silicon compound or an organic silicon compound, having a number average particle diameter of nanometer scale.

According to the present invention, the nano silica particles may have a number average particle diameter of 100 nm or less, preferably 1 to 50 nm, more preferably 5 to 45 nm. Specifically, to control transparency and refractive index of the high refractive index layer, the particle diameter of the nano silica particles may be advantageously controlled within the above range.

Meanwhile, the first binder may include a crosslinked polymer of a multifunctional (meth)acrylate compound.

According to the present invention, the multifunctional (meth)acrylate compound may be a (meth)acrylate based monomer, a (meth)acrylate based oligomer, or a mixture thereof; more preferably, (meth)acrylate monomer, urethane (meth)acrylate oligomer, epoxy (meth)acrylate oligomer, ester (meth)acrylate oligomer, and a combination thereof.

Further, to form a high refractive index layer having higher refractive index, a (meth)acrylate compound including aromatics or substituents such as sulfur, chlorine, metal, and the like may be used. Examples of the (meth)acrylate compound including aromatics or substituents may include dipentaerythritol hexa(meth)acrylate, pentaerythritol tri/tetra (meth)acrylate, trimethylenepropane tri(meth)acrylate, ethyleneglycol di(meth)acrylate, 9,9-bis(4-(2-acryloxyethoxyphenyl)fluorine (refractive index 1.62), bis(4-methacryloxythiophenyl)sulfide (refractive index 1.689), bis(4-vinylthiophenyl)sulfide (refractive index 1.695), and a combination thereof.

Meanwhile, the anti-reflection film of the present invention comprises a low refractive index layer laminated on the high refractive index layer, and comprising a second binder including a crosslinked copolymer of a multifunctional (meth)acrylate compound and a fluorine-based (meth)acrylate compound, and hollow silica particles and hollow silica particles coated with a fluorine-based compound on the surface, which are dispersed in the second binder.

The low refractive index layer refers to a layer having relatively low refractive index with reference to the above-explained high refractive index layer, and positioned upper than the high refractive index layer based on the distance from a base film (upper part of the coating layer), wherein hollow silica particles and hollow silica particles coated with a fluorine-based compound are distributed.

The low refractive index layer may have a refractive index of 1.1 to 1.45 by comprising the second binder, and the hollow silica particles and hollow silica particles coated with a fluorine-based compound, which are dispersed in the second binder.

Meanwhile, the low refractive index layer includes hollow silica particles, which simultaneously includes those which are not coated with a fluorine-based compound and those coated with a fluorine-based compound.

The hollow silica particles refer to silica particles derived from a silicon compound or an organic silicon compound, wherein a hollow space exists on the surface and/or in the silica particles.

Meanwhile, the hollow silica particles coated with a fluorine-based compound refer to the hollow silica particle of which surface is treated with a fluorine-based compound.

The particle diameters of the hollow silica particles and the hollow silica particles coated with a fluorine-based compound may be determined within a range capable of exhibiting anti-reflection effect while maintaining transparency of the film. According to the present invention, the hollow silica particles may have a number average particle diameter of 1 to 200 nm, preferably 5 to 100 nm, more preferably 5 to 80 nm.

Particularly, since the hollow silica particle coated with a fluorine-based compound has a uniform surface due to the coating (treatment) with a fluorine-based compound, sufficient anti-reflection effect may be manifested. And, since the coated hollow silica particles are surface-treated with a fluorine-based compound satisfying specific properties, they have lower surface energy compared to common hollow silica particles (namely, hollow silica particles which are not coated), and thus, have larger surface energy difference from other ingredients in the composition for forming a coating layer. Thus, the coated hollow silica particles may be more smoothly phase-separated (for example, a distribution gradient may be formed) in the composition. Specifically, since a distribution gradient of the coated hollow silica particles is formed toward a direction away from the base film (or the high refractive index layer) by phase separation, at least two layers having different refractive indexes may be formed only by single coating of the composition on the base film.

According to the present invention, the fluorine-based compound used for surface coating of the hollow silica particles may have a refractive index of 1.3~1.4, preferably 1.31~1.4, more preferably 1.31~1.39. Specifically, to manifest minimum anti-reflection effect required in the present invention, the fluorine-based compound may preferably have a refractive index within the above range.

And, the fluorine-based compound may have surface tension of 10~25 mN/m, preferably 12~25 mN/m, more preferably 12~23 mN/m.

Specifically, in order that the hollow silica particles may manifest sufficient compatibility in the composition of the present invention, the fluorine-based compound may preferably have surface tension of 10 mN/m or more. And, in order to manifest minimum phase separation effect required in the present invention, the fluorine-based compound may preferably have surface tension of 25 mN/m or less.

The fluorine-based compound may include any compound satisfying the above described physical properties without specific limitations, and preferably, it may be an alkoxy silane compound containing fluorine. More preferably, the fluorine-based compound may be at least one selected from the group consisting of tridecafluorooctyl triethoxysilane, hetadecafluorodecyl trimethoxysilane, and hetadecafluorodecyl triisopropoxy silane, but not limited thereto.

Further, in order that the surface coating of the hollow silica particles may be efficiently achieved, a non-fluorine based silane compound such as tetraethoxysilane, and the like may be mixed and used in addition to the fluorine-based compound. If the non-fluorine based silane compound is mixed and used, the content of the non-fluorine based silane compound may be 20 wt % or more, preferably 25 wt % or more, more preferably 30 wt % or more of the total silane compound. Thereby, sufficient phase separation effect of the hollow silica particles may be obtained.

Meanwhile, a method of coating the fluorine-based compound on the surface of the hollow silica particles may include a method of hydrolyzing and condensing the hollow silica particles and the fluorine-based compound by a sol-gel reaction in the presence of water and a catalyst, but not limited thereto.

The sol-gel reaction for preparing the hollow silica particles coated with the fluorine-based compound may be conducted by a commonly known method. In the present invention, the sol-gel reaction may be conducted at a reaction temperature of from 0 to 150° C. for 1 to 72 hours, preferably 0 to 100° C. for 1 to 60 hours, more preferably 25 to 70° C. for 1 to 48 hours.

A catalyst used in the sol-gel reaction may control the reaction time of the sol-gel reaction, and preferably, it may include an acid such as nitric acid, hydrochloric acid, acetic acid and oxalic acid; more preferably, hydrochloric acid salt, nitric acid salt, sulfuric acid salt and acetic acid salt together with zirconium and indium salt.

The content of the catalyst may be 0.01 to 10 parts by weight, preferably 0.05 to 9 parts by weight, more preferably 0.1 to 8 parts by weight, based on 100 parts by weight of the fluorine-based compound (if the fluorine-based compound and the non-fluorine based silane compound are mixed and used, based on the content of the mixture).

And, water is used in the sol-gel reaction for the hydrolysis reaction and condensation reaction, and it may be used in an amount of 0.01 to 100 parts by weight, preferably 0.1 to 80 parts by weight, more preferably 0.1 to 60 parts by weight, based on 100 parts by weight of the fluorine-based compound.

Further, in the sol-gel reaction, an organic solvent for controlling molecular weight of the hydrolyzed condensed product may be used, and it may preferably include alcohol, cellosolve, ketone, and a mixture thereof. The content of the organic solvent may be 0.1 to 300 parts by weight, preferably 0.1 to 250 parts by weight, more preferably 0.1 to 200 parts by weight, based on 100 parts by weight of the fluorine-based compound.

Further, in the sol-gel reaction, the content of the composition comprising the fluorine-based compound, catalyst, water and organic solvent may be 5 to 400 parts by weight, preferably 10 to 350 parts by weight, more preferably 10 to 300 parts by weight, based on 100 parts by weight of the hollow silica. Thereby, surface coating of the hollow silica particles may be sufficiently achieved.

Meanwhile, the second binder included in the low refractive index layer includes a crosslinked copolymer of a multifunctional (meth)acrylate compound and a fluorine-based (meth)acrylate compound.

The multifunctional (meth)acrylate compound is as explained above.

The fluorine-based (meth)acrylate compound is a compound capable of progressing a polymerization reaction by energy ray such as UV ray, and the like, and particularly, since it includes fluorine, it has lower refractive index than a (meth)acrylate compound which does not include fluorine, and yet has excellent compatibility with the above-explained hollow silica particles coated with the fluorine-based compound. Thus, if the fluorine-based (meth)acrylate compound is used together with a common multifunctional (meth)acrylate compound, more smooth phase separation may be induced by synergism with the hollow silica particles coated with the fluorine-base compound. Moreover, due to the fluorine-based (meth)acrylate compound, a film having excellent film surface (namely, low refractive index layer) strength and low surface refractive index may be obtained.

The crosslinked copolymer included in the second binder may be one copolymerized with 1 to 30 parts by weight, preferably 1 to 25 parts by weight, more preferably 5 to 20 parts by weight of the fluorine-based (meth)acrylate compound, based on 100 parts by weight of the multifunctional (meth)acrylate compound. Namely, considering synergism obtained by simultaneously using the multifunctional (meth)acrylate compound and the fluorine-based (meth)acrylate compound, and the influence on the mechanical properties such as scratch resistance and abrasion resistance, and the like, the copolymerization ratio may be controlled within the above range.

Meanwhile, the fluorine-based (meth)acrylate compound is not specifically limited as long as it is a compound wherein a fluorine atom is bonded or substituted in a basic structure of (meth)acrylate.

However, according to the present invention, the fluorine-based (meth)acrylate compound may be preferably at least one selected from the group consisting of the following Chemical Formula 1 to Chemical Formula 5.

[Chemical Formula 1]

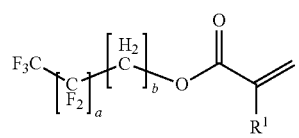

in the Chemical Formula 1, $R^1$ is a hydrogen or C1-C6 alkyl group, a is an integer of from 0 to 7, and b is an integer of from 1 to 3;

[Chemical Formula 2]

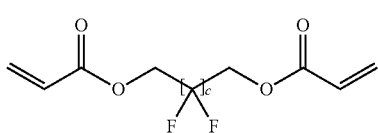

in the Chemical Formula 2, c is an integer of form 1 to 10;

[Chemical Formula 3]

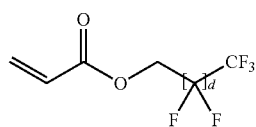

in the Chemical Formula 3, d is an integer of from 1 to 11;

[Chemical Formula 4]

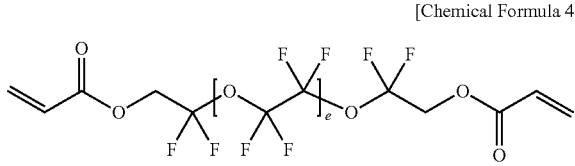

in the Chemical Formula 4, e is an integer of from 1 to 5;

[Chemical Formula 5]

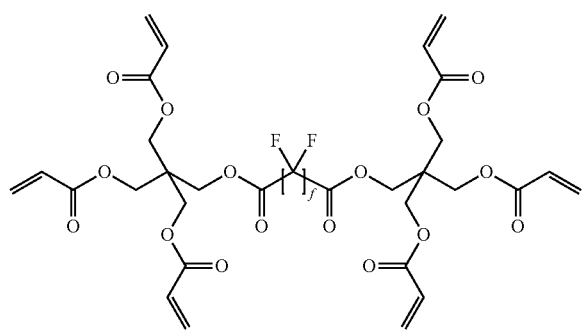

in the Chemical Formula 5, f is an integer of from 4 to 10.

As the fluorine-based (meth)acrylate, a commercial product satisfying the above requirement may be used, and for example, OPTOOL AR110 (manufactured by DAIKIN), LINC-3A and LINC-102A (manufactured by KYOEISHA), PFOA (manufactured by Exfluor), OP-38Z (manufactured by DIC), and the like may be illustrated, without specification.

According to another embodiment of the present invention, provided is a method for manufacturing the anti-reflection film comprising preparing a composition comprising a multifunctional (meth)acrylate compound, a fluorine-based (meth)acrylate compound, nano silica particles, hollow silica particles, hollow silica particles coated with a fluorine-based compound, a solvent, and an initiator;
coating the composition on at least one side of a base film;
drying the coated composition; and
curing the dried composition.

Since the manufacturing method of the anti-reflection film of the present invention uses the above described composition, phase separation may smoothly occur in the coating layer only by single coating, and thus, an anti-reflection coating film having excellent scratch resistance may be manufactured by a simplified process.

Particularly, if the composition is coated on a determined based film, the hollow silica particles, the hollow silica particles coated with a fluorine-based compound, and the fluorine-based (meth)acrylate compound may form a distribution gradient by surface energy difference from the multifunctional (meth)acrylate compound, and more specifically, the distribution gradient increases toward a direction away from the base film.

Namely, if the composition is coated on a base film to form a coating layer, the hollow silica particles, the hollow silica particles coated with a fluorine-based compound, and the fluorine-based (meth)acrylate compound may be slowly phase-separated into the upper part of the coating layer by surface energy difference from the multifunctional (meth)acrylate compound. Thus, the lower part of the coating layer includes the multifunctional (meth)acrylate compound and nano silica particles, and forms a layer (a high refractive index layer) wherein the hollow silica particles are not substantially distributed; and the upper part of the coating layer includes the hollow silica particles, the hollow silica particles coated with a fluorine-based compound, and the fluorine-based (meth)acrylate compound and the multifunctional (meth) acrylate, and forms a layer (a low refractive index layer) wherein a distribution gradient of the hollow silica particles coated with the fluorine-based compound is formed in a direction away from the high refractive index layer. Therefore, the composition may be smoothly phase-separated in the coating layer, and thus, at least two layers may be spontaneously formed only by single coating.

Hereinafter, each step included in the manufacturing method of the anti-reflection film according to the present invention will be explained.

First, a composition for manufacturing the anti-reflection film is prepared.

The composition may include a multifunctional (meth) acrylate compound, a fluorine-based (meth)acrylate compound, nano silica particles, hollow silica particles, hollow silica particles coated with a fluorine-based compound, a solvent, and an initiator According to one embodiment, the composition may comprise, based on 100 parts by weight of the multifunctional (meth)acrylate compound; 1 to 30 parts by weight of the fluorine-based (meth)acrylate compound; 1 to 30 parts by weight of the nano silica particles; 1 to 20 parts by weight of the hollow silica particles; 1 to 60 parts by weight of the hollow silica particles coated with a fluorine-based compound; 100 to 500 parts by weight of the solvent; and 1 to 20 parts by weight of the initiator.

Each ingredient included in the composition is as explained above, and the detailed explanations are skipped.

However, the fluorine-based (meth)acrylate compound may be included in an amount of 1 to 30 parts by weight, preferably 1 to 25 parts by weight, more preferably 5 to 20 parts by weight, based on 100 parts by weight of the multifunctional (meth)acrylate compound. Specifically, considering synergism obtained by simultaneously using the multifunctional (meth)acrylate compound and the fluorine-based (meth)acrylate compound and the influence on the mechanical properties such as scratch resistance and abrasion resistance, and the like, the content of the fluorine-based (meth) acrylate compound may be preferably controlled within the above range.

And, the nano silica particles may be used in the form of a sol having solid content of 5 to 40 wt %, dispersed in a determined dispersion medium. The dispersion medium may include methylethylketone (MEK), methylisobutylketone (MIBK), isopropanol (IPA), methanol, ethyleneglycol, dimethyl acetamide, and the like. According to one embodiment, commercialized silica sol may be used as the inorganic particles, and for example, MEK-ST, MIBK-ST, MIBK-SD, MIBK-SD-L, MEK-AC, DMAC-ST, EG-ST manufactured by Nissan Chemical Industries, Ltd.; Purisol manufactured by Gaematech Co. Ltd., and the like may be used.

And, the content of the nano silica particles may be 0.1 to 30 parts by weight, preferably 1 to 25 parts by weight, more preferably 5 to 20 parts by weight, based on 100 parts by weight of the multifunctional (meth)acrylate compound. Specifically, in order to prevent reduction in anti-reflection effect due to increase in reflectivity by excessive adding while maintaining minimum anti-reflection effect required in the composition of the present invention, the nano silica particles may be included in the above range. However, if the nano silica particles are used in the form of a sol, the content of inorganic particles may be preferably controlled within the above range considering solid content, and the like.

Meanwhile, the content of the hollow silica particles (hollow silica particles that are not coated with a fluorine-based compound) may be 1 to 20 parts by weight, preferably 1 to 15 parts by weight, more preferably 5 to 15 parts by weight, based on 100 parts by weight of the multifunctional (meth) acrylate compound.

And, the content of the hollow silica particles coated with the fluorine-based compound may be 1 to 60 parts by weight, preferably 1 to 50 parts by weight, more preferably 5 to 40 parts by weight, based on 100 parts by weight of the multifunctional (meth)acrylate compound.

Specifically, to prevent reduction in anti-reflection effect due to increase in reflectivity by excessive adding while maintaining minimum anti-reflection effect required in the composition of the present invention, the hollow silica particles and the hollow silica particles coated with the fluorine-based compound may be respectively included in the above range.

And, the hollow silica particles and the hollow silica particles coated with the fluorine-based compound may be included in a colloidal form having a solid content of 5 to 40 wt %, dispersed in a dispersion medium (water or an organic solvent). The organic solvent that can be used as the dispersion medium may include alcohols such as methanol, isoproply alcohol (IPA), ethylene glycol, butanol, and the like; ketones such as methyl ethyl ketone, methyl iso butyl ketone, (MIBK), and the like; aromatic hydrocarbons such as toluene, xylene, and the like; amides such as dimethyl formamide, dimethyl acetamide, N-methyl pyrrolidone, and the like; ester such as ethyl acetate, butyl acetate, γ-butyrolactone, and the like; ether such as tetrahydrofuran, 1,4-dioxane; and a combination thereof. If the hollow silica particles are used in the form of a colloidal solution dispersed in a dispersion medium, the content of the hollow silica particles may be preferably controlled within the above range considering a solid content, and the like.

Particularly, surface energy difference of the hollow silica particles may be varied according to whether or not surface coated with the fluorine-based compound, and thus phase separation effect may be varied in the composition. Considering this, the weight ratio of the hollow silica particles to the hollow silica particles coated with the fluorine-based compound may be controlled within the range of 1:0.1~20, preferably 1:0.5~15, more preferably 1:1~10. Namely, the hollow silica particles coated with the fluorine-based compound may be preferably included in an amount of 50 wt % or more, based on the total weight of the hollow silica particles included in the composition, for smooth phase separation and anti-reflection effect realization.

Meanwhile, the photopolymerization initiator is a compound which may be activated by energy ray such as UV ray, and the like to induce a polymerization reaction of the multifunctional (meth)acrylate compound and the fluorine-based (meth)acrylate compound; preferably, it may include 1-hydroxy cyclohexylphenyl ketone, benzyl dimethyl ketal, hydroxydimethylaceto phenone, benzoin, benzoin methyl ether, benzoin ethyl ether, benzoin isopropyl ether, benzoin butyl ether, and the like.

The content of the photopolymerization initiator may be 1 to 20 parts by weight, preferably 1 to 15 parts by weight, more preferably 5 to 15 parts by weight, based on 100 parts by weight of the multifunctional (meth)acrylate compound. Specifically, in order to sufficiently progress the polymerization reaction of the multifunctional (meth)acrylate compound, the content of the photopolymerization initiator may be preferably 1 part by weight or more, based on 100 parts by weight of the multifunctional (meth)acrylate compound. And, if the photopolymerization initiator is added in an excessive amount, mechanical properties such as scratch resistance, abrasion resistance, and the like of the anti-reflective coating layer may be deteriorated, and in order to prevent this, the content of the photopolymerization initiator may be preferably 20 parts by weight or less, based on 100 parts by weight of the multifunctional (meth)acrylate compound.

Meanwhile, the solvent may be included in the composition of the present invention.

Specifically, as the solvent, those which do not influence on the whole properties of the composition may be used; and preferably, a solvent having a dielectric constant (25° C.) of 20~30 and a dipole moment of 1.7~2.8 may be favorable in terms of smooth phase separation of the composition.

The solvent satisfying the above properties may include methylethylketone, ethylacetate, acetylacetone, and the like, but not limited thereto.

And, in addition to the solvent satisfying the above properties, at least one common solvent selected from the group consisting of isobutylketone, methanol, ethanol, n-butanol, i-butanol, and t-butanol may be further included. However, the solvent satisfying the above dielectric constant and dipole moment ranges may be preferably included in an amount of 60 wt % or more of the total weight of the solvent for smooth phase separation of the hollow particles.

The solvent may be included in an amount of 100 to 500 parts by weight, preferably 100 to 450 parts by weight, more preferably 100 to 400 parts by weight, based on 100 parts by weight of the multifunctional (meth)acrylate compound. Specifically, if flowability is not good during coating of the composition, defect such as stripes in the film may be generated, and thus, in order to give minimum flowability required in the composition, the solvent may be preferably included in an amount of 100 parts by weight or more, based on 100 parts by weight of the multifunctional (meth)acrylate compound. And, if the solvent is added in an excessive amount, solid contents may be too lowered to generate defects during drying and curing, and thus, in order to prevent this, the solvent may be preferably included in an amount of 500 parts by weight or less.

In addition to the above mentioned ingredients, the composition may further include commonly used additives. For example, additive such as an antistatic agent, an antioxidant, a UV-stabilizer, a surfactant, and the like may be further included in the composition according to the properties to be further given to the film. The content of the additives may be determined within the range that does not deteriorate properties of the composition, without specific limitation.

According to the manufacturing method of the anti-reflection film of the present invention, the above composition is coated on at least one side of a base film.

As the base film, a commonly used transparent base film such as triacetate cellulose and the like may be used without specific limitation. And, the method of coating the composition on the base film may be conducted using a common coating apparatus and method.

Subsequently, the coated composition is dried, and the dried composition is cured.

During the drying, the coated composition is phase separated into a high refractive index layer and a low refractive index layer from the base film according to the inclusion of the hollow silica particles, the hollow silica particles coated with the fluorine-based compound on the surface, and the fluorine based (meth)acrylate.

Specifically, the low refractive index layer is a layer including the hollow silica particles, the hollow silica particles coated with a fluorine-based compound, the fluorine-based (meth)acrylate compound, and the multifunctional (meth) acrylate compound.

Namely, in the lower part of the coating layer, the multifunctional (meth)acrylate compound is included, and a layer (a high refractive index layer) wherein the hollow silica particles and fluorine-based (meth)acrylate compound are not substantially distributed is formed; and in the upper part of the coating layer, the hollow silica particles, the hollow silica particles coated with a fluorine-based compound, the fluorine-based (meth)acrylate compound, and the multifunctional (meth)acrylate compound are included, and a layer (a low refractive index layer) is formed wherein a distribution gradient of the hollow silica particles is formed in a direction away from the base film.

The phase separation of the composition is not artificial, and it is naturally achieved by surface energy difference between compositional ingredients. Thus, it may be conducted by coating the composition, and then, standing under specific conditions to dry. Specifically, to facilitate phase separation of the composition in the drying step and achieve sufficient phase separation, it may be preferably conducted at a temperature of from 5 to 150° C. for 0.1 to 60 minutes.

In the curing step, light is irradiated to the dried composition layer to initiate a polymerization reaction and thereby curing the composition layer, and it may be conducted under common photocure reaction conditions. However, to induce a sufficient cure reaction, the curing may be preferably conducted at a UV irradiation amount of 0.1 to 2 $J/cm^2$ for 1 to 600 seconds.

After passing the curing step, an anti-reflection film is formed, which comprises a high refractive index layer comprising a first binder including a crosslinked polymer of a multifunctional (meth)acrylate compound, and nano silica particles dispersed in the first binder; and a low refractive index layer laminated on the high refractive index layer, and comprising a second binder including a crosslinked copolymer of a multifunctional (meth)acrylate compound and a fluorine-based (meth)acrylate compound, and hollow silica particles and hollow silica particles coated with a fluorine-based compound on the surface, which are dispersed in the second binder.

Meanwhile, the method for manufacturing an anti-reflection film of the present invention may further include commonly conducted steps before or after each step, in addition to the above explained steps.

Hereinafter, the present invention will be explained with reference to the following Examples. However, these Examples are only to illustrate the invention, and the invention is not limited thereto.

Preparation Example 1

Preparation of Hollow Particles Coated with Fluorine-Containing Alkoxysilane on the Surface A silane compound including about 30 wt % of hetadecafluorodecyl trimethoxy silane (refractive index 1.331, surface tension 20.7 mN/m, measured with reference to water and diiodide methane($CH_2I_2$), measuring device: KRUSS Co., Drop shape analysis DSA100) and about 70 wt % of tetraethoxy silane was prepared.

To 100 parts by weight of the silane compound, about 0.0006 parts by weight of water, about 3.26 parts by weight of oxalic acid as a catalyst, and about 116.28 parts by weight of ethanol as an organic solvent were added to prepare a silane composition.

Subsequently, 100 parts by weight of a sol in which hollow silica particles are dispersed (dispersion medium: methylisobutylketone, solid content 20 wt %, number average particle diameter: 50 nm, manufactured by Catalysts & Chemicals Industries Co. Ltd, Product name: MIBK-sol) and about 14.69 parts by weight of the silane composition were mixed, and then, the mixture was subjected to a sol-gel reaction at a reaction temperature of 30° C. for 24 hours to prepare hollow silica particles coated with fluorine-containing alkoxysilane on the surface.

Preparation Example 2

Preparation of Hollow Particles Coated with Fluorine-Containing Alkoxysilane on the Surface A silane compound including about 30 wt % of hetadecafluorodecyl trimethoxy silane (refractive index 1.331, surface tension 20.7 mN/m, measured with reference to water and diiodide methane($CH_2I_2$), measuring device: KRUSS Co., Drop shape analysis DSA100) and about 70 wt % of tetraethoxy silane was prepared.

To 100 parts by weight of the silane compound, about 26.97 parts by weight of water, about 3.28 parts by weight of oxalic acid as a catalyst, and about 164.20 parts by weight of ethanol as an organic solvent were added to prepare a silane composition.

Subsequently, 100 parts by weight of a sol in which hollow silica particles are dispersed (dispersion medium: isopropanol, solid content 20 wt %, number average particle diameter: 50 nm, manufactured by Catalysts & Chemicals Industries Co. Ltd, Product name: MIBK-sol) and about 249.93 parts by weight of the silane composition were mixed, and then, the mixture was subjected to a sol-gel reaction at a reaction temperature of 30° C. for 24 hours to prepare hollow silica particles coated with fluorine-containing alkoxysilane on the surface.

Example 1

Preparation of Anti-Reflective Coating Composition

Based on 100 parts by weight of pentaerythritol hexaacrylate (PETA) as multifunctional acrylate;

about 10.85 parts by weight of a photopolymerization initiator (specifically, about 1.11 parts by weight of Darocur-1173, about 6.48 parts by weight of Iragacure-184, and about 2.15 parts by weight of Iragacure-819, and about 1.11 parts by weight of Irgacure-907);

about 251.85 parts by weight of a solvent (specifically, about 179.63 parts by weight of methylethylketone (MEK), about 24.07 parts by weight of ethanol, about 24.07 parts by weight of n-butylalcohol, and about 24.07 parts by weight of acetylacetone);

about 11.33 parts by weight of a colloidal solution in which hollow silica particles are dispersed (dispersion medium: methylisobutylketone, solid content 20 wt %, number average particle diameter of hollow silica: 50 nm, manufactured by Catalysts & Chemicals Industries Co. Ltd, Product name: MIBK-sol);

about 11.33 parts by weight of the hollow silica particles coated with the fluorine-based compound on the surface according to the Preparation Example 1 about 11.33 parts by weight of fluorine-containing acrylate (product name: OPTOOL AR110, manufactured by DAIKIN, solid content 15 wt % (methylisobutylketone solvent), corresponding to the compound of the Chemical Formula 5); and about 15.87 parts by weight of silica sol in which nano silica particles are dispersed (dispersion medium: methylisobutylketone and methylalcohol, solid content 40 wt %, number average particle diameter: 10 nm, manufactured by Gaematech, product name: Purisol)

were mixed to prepare an anti-reflective coating composition.

Manufacture of Anti-Reflection Film

The anti-reflective coating composition was coated on a triacetate cellulose film (thickness 80 μm) using a wire bar (no. 9). It was dried in an oven of 90° C. for 1 minute, and then, UV energy of 200 mJ/cm$^2$ was irradiated for 5 seconds to cure the composition.

Thereby, a film including an anti-reflective coating layer of about 3 μm (thickness of low refractive index layer including hollow silica and hollow silica coated with fluorine-based compound on the surface: about 0.12 μm) was obtained.

Example 2

Preparation of Anti-Reflective Coating Composition

An anti-reflective coating composition was prepared by the same method and condition as Example 1, except using the hollow silica particles coated with a fluorine-based compound according to the Preparation Example 2.

Manufacture of Anti-Reflection Film

A film including an anti-reflection coating layer of a thickness of about 3 μm (thickness of low refractive index layer including hollow silica and hollow silica coated with a fluorine-based compound: about 0.12 μm) was obtained by the same method and condition as Example 1, except using the above prepared anti-reflective coating composition.

Example 3

Preparation of Anti-Reflective Coating Composition

Based on 100 parts by weight of pentaerythritol hexaacrylate (PETA) as multifunctional acrylate;
about 10.85 parts by weight of a photopolymerization initiator (specifically, about 1.11 parts by weight of Darocur-1173, about 6.48 parts by weight of Iragacure-184, and about 2.15 parts by weight of Iragacure-819, and about 1.11 parts by weight of Irgacure-907);
about 251.85 parts by weight of a solvent (specifically, about 179.63 parts by weight of methylethylketone (MEK), about 24.07 parts by weight of ethanol, about 24.07 parts by weight of n-butylalcohol, and about 24.07 parts by weight of acetylacetone);
about 24.61 parts by weight of a colloidal solution in which hollow silica particles are dispersed (dispersion medium: methylisobutylketone, solid content 20 wt %, number average particle diameter of hollow silica: 50 nm, manufactured by Catalysts & Chemicals Industries Co. Ltd, Product name: MIBK-sol);
about 12.30 parts by weight of the hollow silica particles coated with the fluorine-based compound on the surface according to the Preparation Example 1; and
about 11.33 parts by weight of fluorine-containing acrylate (product name: OPTOOL AR110, manufactured by DAIKIN, solid content 15 wt % (methylisobutylketone solvent), corresponding to the compound of the Chemical Formula 5)
were mixed to prepare an anti-reflective coating composition.

Manufacture of Anti-Reflection Film

A film including an anti-reflection coating layer of a thickness of about 3 μm (thickness of low refractive index layer including hollow silica and hollow silica coated with a fluorine-based compound: about 0.12 μm) was obtained by the same method and condition as Example 1, except using the above prepared anti-reflective coating composition.

Example 4

Preparation of Anti-Reflective Coating Composition

Based on 100 parts by weight of pentaerythritol hexaacrylate (PETA) as multifunctional acrylate;
about 10.85 parts by weight of a photopolymerization initiator (specifically, about 1.11 parts by weight of Darocur-1173, about 6.48 parts by weight of Iragacure-184, and about 2.15 parts by weight of Iragacure-819, and about 1.11 parts by weight of Irgacure-907);
about 251.85 parts by weight of a solvent (specifically, about 179.63 parts by weight of methylethylketone (MEK), about 24.07 parts by weight of ethanol, about 24.07 parts by weight of n-butylalcohol, and about 24.07 parts by weight of acetylacetone);
about 18.45 parts by weight of a colloidal solution in which hollow silica particles are dispersed (dispersion medium: methylisobutylketone, solid content 20 wt %, number average particle diameter of hollow silica: 50 nm, manufactured by Catalysts & Chemicals Industries Co. Ltd, Product name: MIBK-sol);
about 18.45 parts by weight of the hollow silica particles coated with the fluorine-based compound on the surface according to the Preparation Example 1; and
about 11.33 parts by weight of florine-containing acrylate (product name: OPTOOL AR110, manufactured by DAIKIN, solid content 15 wt % (methylisobutylketone solvent), corresponding to the compound of the Chemical Formula 5)
were mixed to prepare an anti-reflective coating composition.

Manufacture of Anti-Reflection Film

A film including an anti-reflection coating layer of a thickness of about 3 μm (thickness of low refractive index layer including hollow silica and hollow silica coated with a fluorine-based compound: about 0.12 μm) was obtained by the same method and condition as Example 1, except using the above prepared anti-reflective coating composition.

Comparative Example 1

A composition with the same composition as Example 1 was prepared, except that the fluorine-based acrylate was not added, and the hollow silica particles coated with the fluorine-based compound according to the Preparation Example 1 was added in the amount of about 22.67 parts by weight.
And, a film including an anti-reflection coating layer of a thickness of about 3 μm was obtained by the same method and conditions as Example 1 using the above composition.

Comparative Example 2

A composition with the same composition as Example 1 was prepared, except that the multifunctional acrylate was not added. Each ingredient was added based on 100 parts by weight of the fluorine-based acrylate.
And, a film including an anti-reflection coating layer of a thickness of about 3 μm was obtained by the same method and conditions as Example 1 using the above composition.

Comparative Example 3

A composition with the same composition as Example 1 was prepared, except that a silica sol in which nano silica particles are dispersed was not added.
And, a film including an anti-reflection coating layer of a thickness of about 3 μm was obtained by the same method and conditions as Example 1 using the above composition.

Comparative Example 4

A composition with the same composition as Example 1 was prepared, except that a silica sol in which nano silica particles are dispersed was not added, and an isopropyl alcohol solution in which antimony-containing tin oxide (ATO) is dispersed (solid content 40 wt %) was added in the amount of 15.87 parts by weight.
And, a film including an anti-reflection coating layer of a thickness of about 3 μm was obtained by the same method and conditions as Example 1 using the above composition.

Comparative Example 5

A composition with the same composition as Example 1 was prepared, except that the colloidal solution in which hollow silica is dispersed and the silica sol in which nano silica particles are dispersed were not added, and the isopropyl alcohol solution in which antimony-containing tin oxide (ATO) is dispersed (solid content 40 wt %) was added in the amount of 15.87 parts by weight.

And, a film including an anti-reflection coating layer of a thickness of about 3 μm was obtained by the same method and conditions as Example 1 using the above composition.

Experimental Example

The anti-reflection films manufactured in the Examples and Comparative Examples were evaluated, and the results are shown in Table 1.

1) Reflectivity measurement: The back of the anti-reflection film was black-treated, and then, low reflection property was evaluated by minimum reflectivity value. As a measuring instrument, Solid Spec. 3700 spectrophotometer manufactured by Shimadzu Co. was used.

2) Transmittance and Haze measurement: Transmittance and haze were evaluated using HR-100 of Japan Murakami Co.

3) Scratch resistance evaluation: A steel wool with a load of 500 g/cm$^2$ was reciprocated 10 times at a speed of 24 m/min on the anti-reflection film, and then, the number of scratch with a length of 1 cm or more on the surface was examined. If the number of scratch with a length of 1 cm or more is less than 5, the anti-reflection film was evaluated as excellent (○), 5 or more and less than 15, average (Δ), and 15 or more, bad (X).

TABLE 1

| | Reflectivity (%) | Transmittance (%) | Haze (%) | Scratch resistance |
|---|---|---|---|---|
| Example 1 | 1.11 | 96.2 | 0.4 | ○ |
| Example 2 | 1.13 | 96.0 | 0.5 | ⊚ |
| Example 3 | 1.20 | 95.7 | 0.4 | ○ |
| Example 4 | 1.16 | 96.0 | 0.4 | ○ |
| Comparative Example 1 | 1.39 | 96.6 | 0.4 | Δ |
| Comparative Example 2 | 2.50 | 93.9 | 1.20 | X |
| Comparative Example 3 | 1.40 | 95.0 | 0.7 | Δ |
| Comparative Example 4 | 2.80 | 93.8 | 3.2 | X |
| Comparative Example 5 | 4.20 | 93.0 | 3.7 | X |

As shown in Table 1, the anti-reflection films of Examples 1-4 exhibit higher transmittance and lower reflectivity, and excellent scratch resistance, compared to the films of Comparative Example 1-5.

These results are considered to be derived from the fact that the anti-reflection films of Examples 1-4 comprises hollow silica particles, hollow silica particles coated with a fluorine-based compound, and fluorine-based (meth)acrylate in the low refractive index layer, and the distribution rate of the hollow silica particles increases in a direction away from the base film. Namely, it is considered that as the hollow silica particles and the hollow silica particles coated with the fluorine-based compound on the surface are distributed more in a direction away from the base film, reflectivity of the surface is lowered and scratch resistance further improves.

Further, since Comparative Example 2 does not include multifunctional (meth)acrylate but includes only fluorine-based acrylate as a binder, it exhibited lower scratch resistance, high reflectivity, and very serious Haze, compared to Example 1. And, since Comparative Example 3 does not include nano silica particles in the high refractive index layer, scratch resistance was lowered compared to Example 1. And, although Comparative Example 4 includes metal oxide such as ATO instead of nano silica particles in the high refractive index layer, Haze became very serious, and thus reflectivity increased and scratch resistance was lowered compared to Example 1.

The invention claimed is:

1. An anti-reflection film comprising:
   a high refractive index layer comprising a first binder including a crosslinked polymer of a multifunctional (meth)acrylate compound, and nano silica particles dispersed in the first binder; and
   a low refractive index layer laminated on the high refractive index layer, and comprising a second binder including a crosslinked copolymer of a multifunctional (meth)acrylate compound and a fluorine-based (meth)acrylate compound, and hollow silica particles and hollow silica particles coated with a fluorine-based compound on the surface, which are dispersed in the second binder,
   wherein the weight ratio of the hollow silica particles to the hollow silica particles coated with the fluorine-based compound in the low refractive index layer is 1:1~10, and
   wherein the hollow silica particles coated with a fluorine-based compound on the surface in the low refractive index layer has a distribution gradient increasing toward a direction away from the high refractive index layer.

2. The anti-reflection film according to claim 1, wherein the high refractive index layer has a refractive index of 1.5 to 1.58, and the low refractive index has a refractive index of 1.1 to 1.45.

3. The anti-reflection film according to claim 1, wherein the fluorine-based compound coated on the hollow silica particles has a refractive index of 1.3~1.4 and surface tension of 10~25 mN/m.

4. The anti-reflection film according to claim 1, wherein the fluorine-based compound coated on the hollow silica particles is a fluorine-containing alkoxysilane compound.

5. The anti-reflection film according to claim 1, wherein the fluorine-based compound coated on the hollow silica particles is at least one selected from the group consisting of tridecafluorooctyl triethoxy silane, heptadecafluorodecyl trimethoxy silane, and heptadecafluorodecyl triisopropoxy silane.

6. The anti-reflection film according to claim 1, wherein the fluorine-based (meth)acrylate compound is at least one selected from the group consisting of the following Chemical Formula 1 to 5:

[Chemical Formula 1]

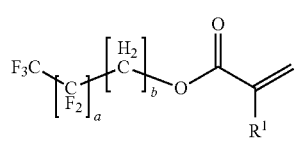

in the Chemical Formula 1, $R^1$ is a hydrogen or C1-C6 alkyl group, a is an integer of from 0 to 7, and b is an integer of from 1 to 3;

[Chemical Formula 2]

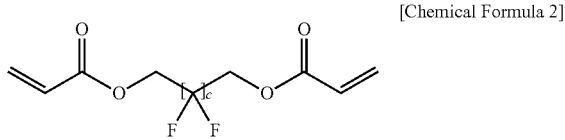

in the Chemical Formula 2, c is an integer of form 1 to 10;

[Chemical Formula 3]

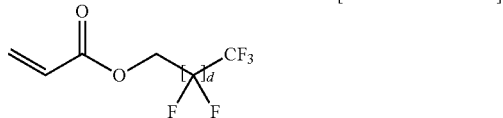

in the Chemical Formula 3, d is an integer of from 1 to 11;

[Chemical Formula 4]

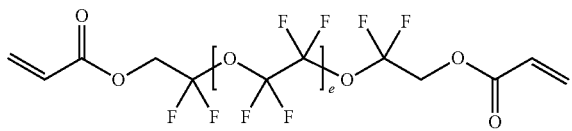

in the Chemical Formula 4. e is an integer of from 1 to 5:

[Chemical Formula 5]

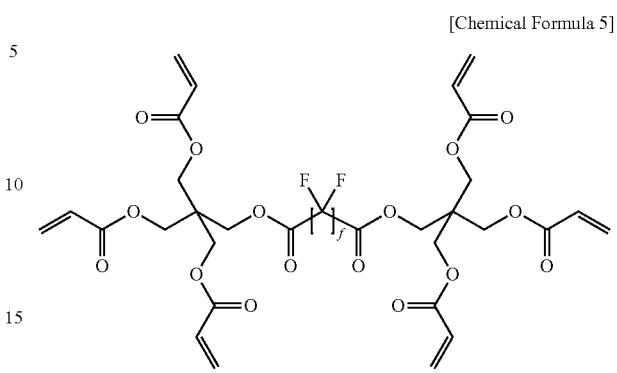

in the Chemical Formula 5, f is an integer of from 4 to 10.

7. The anti-reflection film according to claim 1, wherein the nano silica particles in the high refractive index layer have a number average particle diameter of 100 nm or less.

8. The anti-reflection film according to claim 1, wherein the hollow silica particles and the hollow silica particles coated with the fluorine-based compound in the low refractive index layer respectively have a number average particle diameter of 1 to 200 nm.

* * * * *